(12) United States Patent
Koyama et al.

(10) Patent No.: US 9,557,451 B2
(45) Date of Patent: Jan. 31, 2017

(54) DIFFUSING PLATE HAVING MICROLENS ARRAY

(71) Applicant: CANON KABUSHIKI KAISHA, Tokyo (JP)

(72) Inventors: Masatsugu Koyama, Yokohama (JP); Makoto Kojima, Atsugi (JP); Yukiya Enokida, Kawasaki (JP); Yukinobu Okura, Tokyo (JP); Masato Tanaka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 154 days.

(21) Appl. No.: 14/309,759

(22) Filed: Jun. 19, 2014

(65) Prior Publication Data

US 2014/0376095 A1 Dec. 25, 2014

(30) Foreign Application Priority Data

Jun. 21, 2013 (JP) .................................. 2013-130860

(51) Int. Cl.
*G02B 5/02* (2006.01)
*G02B 27/16* (2006.01)

(52) U.S. Cl.
CPC ........... *G02B 5/0221* (2013.01); *G02B 5/0268* (2013.01); *G02B 5/0278* (2013.01); *G02B 27/16* (2013.01)

(58) Field of Classification Search
CPC ... G02B 3/0006; G02B 3/0037; G02B 3/0043; G02B 3/005; G02B 3/0056; G02B 3/0062; G02B 3/0068; G02B 5/02; G02B 5/021; G02B 5/0215; G02B 5/0221; G02B 5/0231; G02B 5/0252; G02B 5/0278; G03B 13/00; G03B 13/16; G03B 13/20
USPC .............. 359/599, 618, 619, 620, 621, 622, 623,359/624, 626, 628; 396/111, 113
See application file for complete search history.

(56) References Cited

U.S. PATENT DOCUMENTS

| | | | | |
|---|---|---|---|---|
| 7,336,895 B2* | 2/2008 | Okazaki | ................ | G03B 15/02 359/599 |
| 7,813,054 B2* | 10/2010 | Sales | .................... | G02B 3/0043 359/707 |
| 2006/0050379 A1 | 3/2006 | Yee et al. | | |

FOREIGN PATENT DOCUMENTS

| | | |
|---|---|---|
| CN | 1386204 A | 12/2002 |
| CN | 1906503 A | 1/2007 |
| CN | 102478675 A | 5/2012 |
| JP | 63-221329 A | 9/1988 |
| JP | 03-192232 A | 8/1991 |
| TW | 201211625 A | 3/2012 |
| TW | 201308004 A | 2/2013 |
| WO | 2005/093466 A1 | 10/2005 |

* cited by examiner

*Primary Examiner* — Arnel C Lavarias
(74) *Attorney, Agent, or Firm* — Canon USA Inc., IP Division

(57) ABSTRACT

A diffusing plate includes a microlens array in which a plurality of microlenses are arranged, wherein the microlenses have such a shape that a curvature of a sectional shape including a center line of the microlenses varies depending on a direction of the center line, and wherein microlenses that are different in the direction of a center line where the curvature of the outline is largest are arranged.

8 Claims, 10 Drawing Sheets

DIFFUSING PLATE HAVING MICROLENS ARRAY

BACKGROUND OF THE INVENTION

Field of the Invention

The present invention relates to a diffusing plate having a microlens array. More specifically, the present invention relates to a diffusing plate used for the focusing of a finder system of a single lens reflex camera or the like.

Description of the Related Art

Hitherto, there has been known a diffusing plate on which many microlenses are arranged. However, in a diffusing plate that is used for the focusing of a finder system of a single lens reflex (SLR) camera or the like and on which many microlenses are arranged, the direction of diffracted light is limited to a particular direction, and the blur quality may become unnatural. When used together with a Fresnel lens, such a diffusing plate causes interference with the zonal structure of the Fresnel lens, and moire fringes may be generated. For this reason, a diffusing plate in which the distance between microlenses is changed has been proposed as disclosed in Japanese Patent Laid-Open No. 63-221329, and a diffusing plate in which the height of the vertices of microlenses is changed has been proposed as disclosed in Japanese Patent Laid-Open No. 03-192232.

However, in order to make unnaturalness of blur quality and moire fringes less noticeable, it is necessary to break the periodicity due to the change in the distance between microlenses described in Japanese Patent Laid-Open No. 63-221329 or the change in the height of the vertices of microlenses described in Japanese Patent Laid-Open No. 03-192232. However, the breaking of periodicity has the following problems. When a variation is created in the distance between microlenses, the whole diffusing plate divides into a part in which microlenses are densely arranged (dense part), and a part in which microlenses are sparsely arranged (sparse part). Light passes through the sparse part without being diffused. Therefore, if the sparse part increases, focusing becomes difficult. When a variation is created in the height of the vertices of microlenses, the diffusion angle of outgoing light is large between a microlens whose vertex is high and a microlens whose vertex is low, a light beam reaches the outside of the pupil of the finder, and therefore the finder image tends to become dark.

The present invention provides a diffusing plate having a microlens array in which unnaturalness of blur quality and moire fringes are less noticeable, with which focusing can be easily carried out. In this manner, a finder that is bright is achieved.

SUMMARY OF THE INVENTION

In an aspect of the present invention, a diffusing plate includes a microlens array in which a plurality of microlenses are arranged, wherein the microlenses have such a shape that a curvature of a sectional shape including a center line of the microlenses varies depending on a direction of the center line, and wherein microlenses that are different in the direction of a center line where the curvature is largest are arranged.

Further features of the present invention will become apparent from the following description of exemplary embodiments with reference to the attached drawings.

DESCRIPTION OF THE EMBODIMENTS

First Embodiment

Figure 1A:
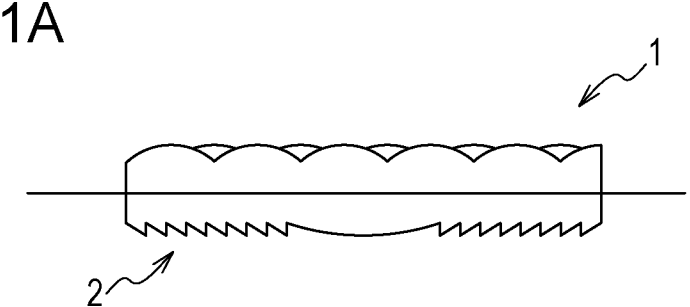
FIGS. 1A to 1E illustrate a diffusing plate according to a first embodiment.
Figure 1B:
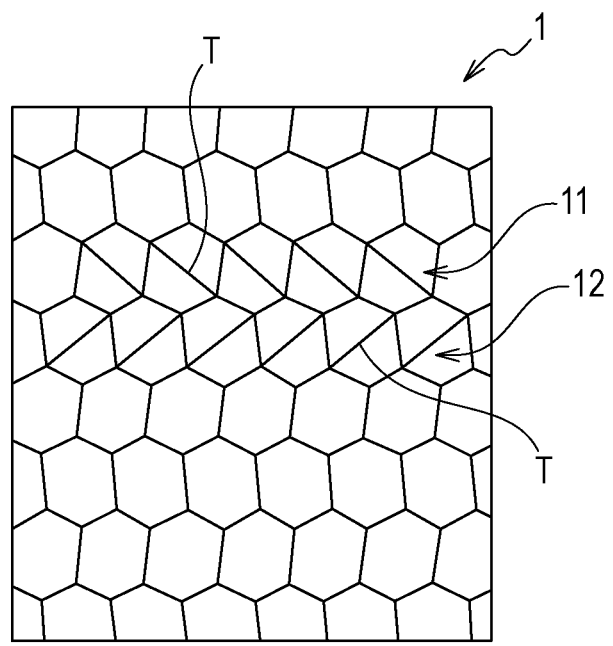
Figure 1C:
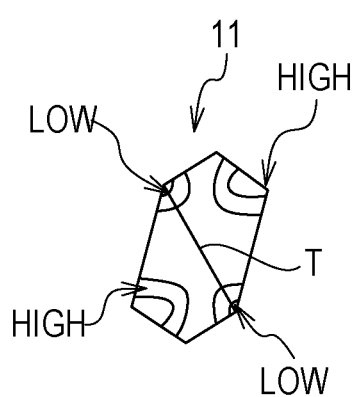
Figure 1D:
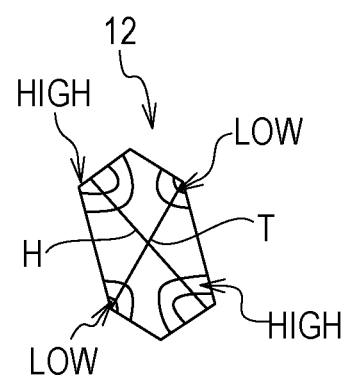

FIGS. 1A to 1D show schematic diagrams of a diffusing plate of a first embodiment. FIG. 1A is an enlarged sectional view, and FIG. 1B is a schematic top view of a microlens array forming surface. FIG. 1C is an enlarged view of a single microlens 11. FIG. 1D is an enlarged view of a single microlens 12.

The diffusing plate of this embodiment has an array 1 of a large number of microlenses formed on one side thereof, and a Fresnel lens 2 formed on the other side thereof. Each microlens has a shape different from a spherical shape or a toroidal shape which is the shape of conventional microlenses. A spherical shape refers to a shape that is symmetrical with respect to each of two orthogonal axes and in which the curvature on one of the axes is equal to the curvature on the other axis. A toroidal shape refers to a shape that is symmetrical with respect to each of two orthogonal axes and in which the curvature on one of the axes is different from the curvature on the other axis.

Figure 1E:
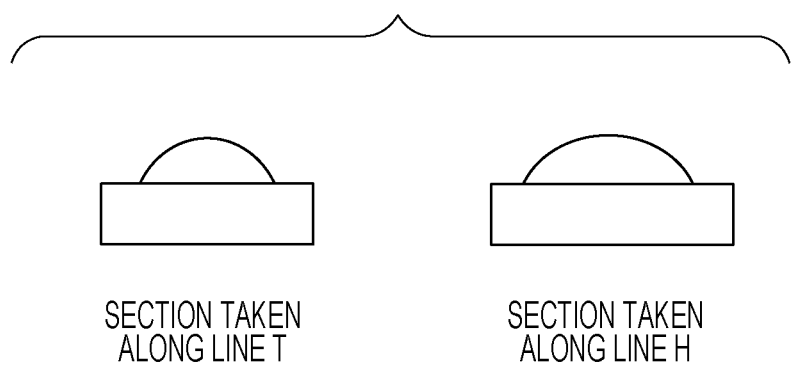

Specifically, a description will be given, taking a microlens 11 as an example. The shape of the microlens 11 is such that the curvature of the sectional shape including a center line T of the microlens 11 varies depending on the direction of the center line. The center is a vertex, and shows the highest position of the microlens 11. The outline at this time is not always a part of a true circle (circular arc), and examples thereof include a slightly deformed shape. In that case, the curvature of the outline is the approximate curvature. The approximate curvature is found by a known method. The microlens of this embodiment has such a shape that the curvature varies depending on the direction of the center line. Specifically, when the average of different curvatures (average curvature) is compared to the curvature of the sectional shape including a center line of the microlens 11, the microlens has parts having curvatures smaller than the average curvature and parts having curvatures larger than the average curvature. The average curvature is found, for example, by changing the direction of the center line, measuring a plurality of sectional shapes, and calculating the average of the curvatures thereof. FIG. 1C shows the shape of the microlens 11, the difference from a spherical shape having the average curvature, using contour lines. FIG. 1D shows the shape of a microlens 12, the difference from a spherical shape having the average curvature, using contour lines. In this specification, a spherical shape refers to a spherical shape having the average curvature. As described above, the microlenses of this embodiment have a very characteristic shape. Specifically, they have such a saddle shape that two high parts and two low parts are formed at axisymmetrical positions. FIG. 1E shows sectional shapes taken along center lines T and H of FIG. 1D. As can be seen from FIG. 1E, in the high parts, the curvature of the sectional shape including a center line of the microlens is smaller than the average curvature. In the low parts, the curvature of the sectional shape including a center line of the microlens is larger than the average curvature. This embodiment has a plurality of rows of microlenses. When the microlens array is viewed from above, the position of a part in which the curvature of the sectional shape including a center line of the microlens is larger than the average curvature, differs from one row to another. That is, the direction of a center line where the curvature of the sectional shape including the center line of the microlens is largest, differs from one row to another.

By arranging these characteristic microlenses such that the direction of a center line where the curvature of the sectional shape including the center line is largest, differs from one row to another, the problem caused by periodicity in the conventional microlens array is overcome. Therefore, a uniform diffusion property with low directivity can be obtained, and natural unblurred visibility can be provided. A diffusing plate that is free from moire fringes when used together with a Fresnel lens can be obtained. Since neither the change in the distance between microlenses nor the change in the height of the vertices of microlenses is used, a diffusing plate with which focusing can be easily carried out and that is bright can be obtained.

In this embodiment, when arranging a large number of microlenses, rows of microlenses 11 described with reference to FIG. 1C and rows of microlenses 12 described with reference to FIG. 1D are alternately arranged. The microlens 12 differs from the microlens 11 in the position of a part in which the curvature of the sectional shape including a center line of the microlens is larger than the average curvature. In FIG. 1D, a center line where the curvature of the sectional shape including the center line of the microlens is largest, is denoted by T. Difference in the position of a part in which the curvature of the sectional shape including a center line of the microlens is larger than the average curvature means, for example, difference in the direction of this center line T when the microlens array is viewed from above.

Next, a manufacturing method of a diffusing plate according to this embodiment will be described.

Figure 2A:
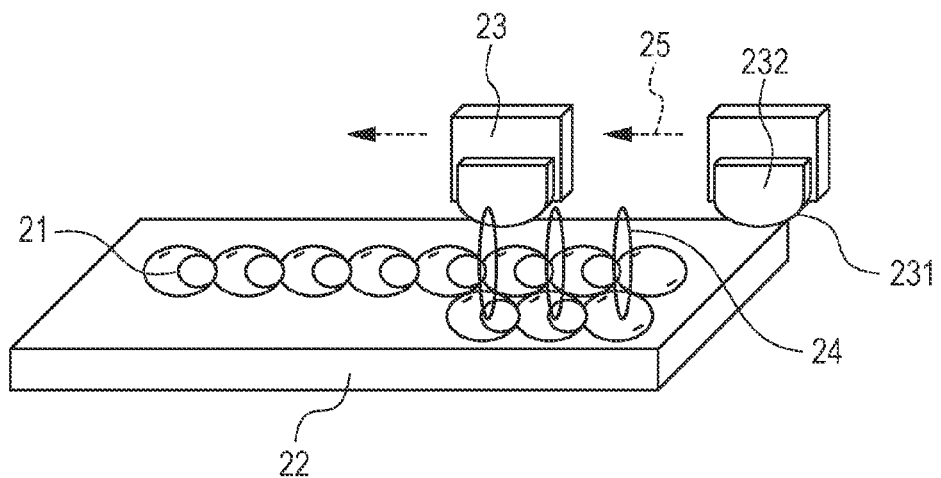
FIGS. 2A to 2C illustrate a manufacturing method of forming a microlens array on a side of the diffusing plate according to the first embodiment.
Figure 2B:
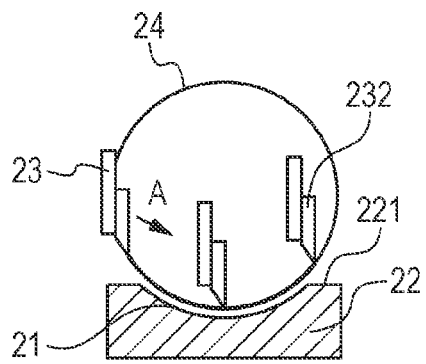
Figure 2C:
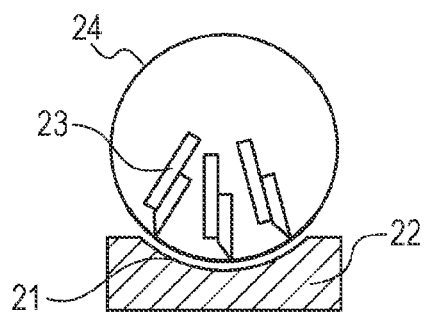

FIGS. 2A to 2C are schematic diagrams showing a manufacturing method of a diffusing plate according to this embodiment. The manufacturing method of a diffusing plate according to this embodiment includes forming microlens transfer shapes that are transferred to make microlenses, in a mold, and transferring the formed microlens transfer shapes to resin to manufacture a diffusing plate having a microlens array.

In FIGS. 2A to 2C, reference numeral 21 designates a microlens transfer shapes, reference numeral 22 designates a workpiece (mold), reference numeral 23 designates a tool, reference numeral 24 designates circular movement, and reference numeral 25 designates linear movement (processing feed).

In this embodiment, the cutting edge of a tool having an arcuate cutting edge 231 is circularly moved 24 in a direction intersecting with the tool cutting face 232. At the same time, the cutting edge of the tool is linearly moved (processing-fed) 25 in a direction intersecting with the direction of the circular movement. Microlens transfer shapes are thereby continuously formed in the workpiece.

Figure 3A:
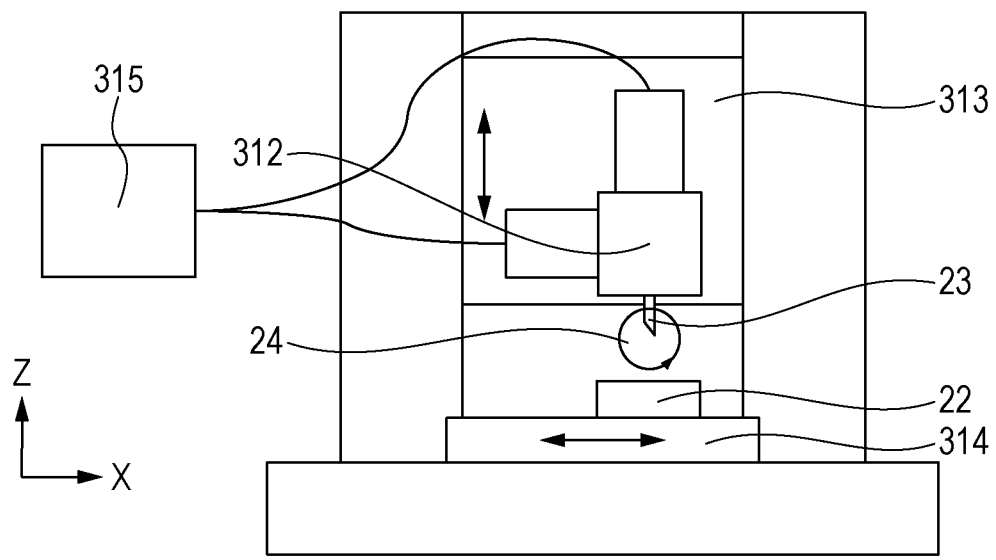
FIGS. 3A and 3B illustrate a processing machine.
Figure 3B:
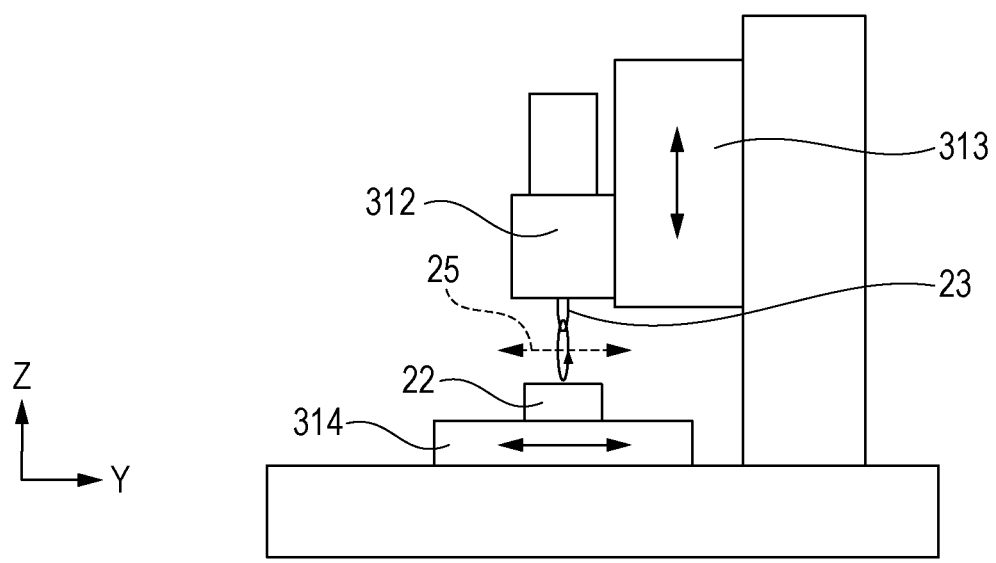

FIGS. 3A and 3B show schematic diagrams of a processing machine. A known high-precision processing machine capable of commanding cutting in submicron order is used as the processing machine. In FIGS. 3A and 3B, the same reference numerals will be used to designate the same parts as those in FIGS. 2A to 2C, and the description thereof will be omitted. The processing machine has a Z-axis moving table 313 and an XY-axis moving table 314. A high-speed circular movement device 312 is used as a device for circularly moving the cutting edge of the tool 23. In this embodiment, a magnetostriction vibrator is used as a driving source for circular movement.

Two magnetostriction vibrators are disposed in orthogonal directions in the high-speed circular movement device 312, the amplitude, cycle, phase, and so forth of the reciprocating movement of each magnetostriction vibrator is controlled by an arbitrary waveform generator 315, and the cutting edge of the tool is circularly moved 24. By moving the XY-axis moving table 314 in the Y-axis direction, the cutting edge of the tool is linearly moved.

By carrying out the above-described circular movement and linear movement, the movement locus of the tool is unambiguously determined, and draws a helix.

FIG. 2B and FIG. 2C illustrate the relationship between the locus 24 of circular movement and the tool. FIG. 2B shows a schematic diagram in the case where the tool 23 is kept in a fixed direction and is circularly moved. When keeping the tool 23 in a fixed direction, the tool 23 may be circularly moved with the cutting face perpendicular to the processed surface 221 of the workpiece as shown in FIG. 2B, or the tool 23 may be circularly moved with the cutting face inclined in the direction A at an angle of 1° to 20°. The tool 23 may be circularly moved, as shown in FIG. 2C, such that the cutting face of the tool 23 faces in a direction normal to the circle of circular movement (such that the center of the circle of circular movement lies on an extension line of the cutting face).

By adding linear movement to this circular movement, the locus of the cutting edge of the tool draws a helix, and the characteristic microlens transfer shapes of this embodiment can be processed. A plurality of microlenses can be continuously formed in the workpiece.

Figure 4A:
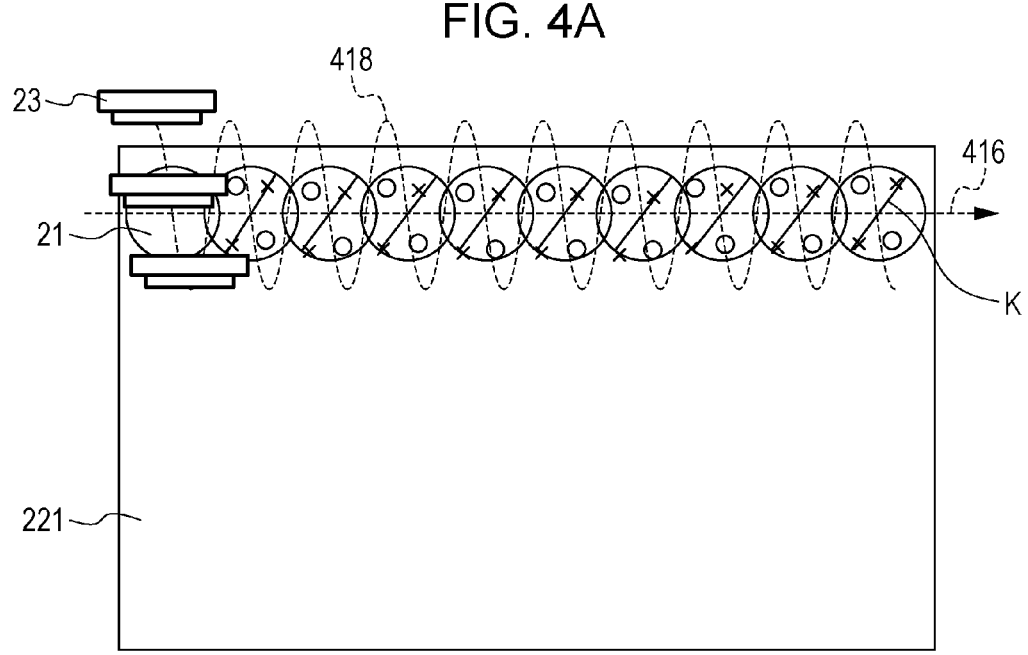
FIGS. 4A and 4B illustrate a process of forming a microlens array on a side of the diffusing plate according to the first embodiment.
Figure 4B:
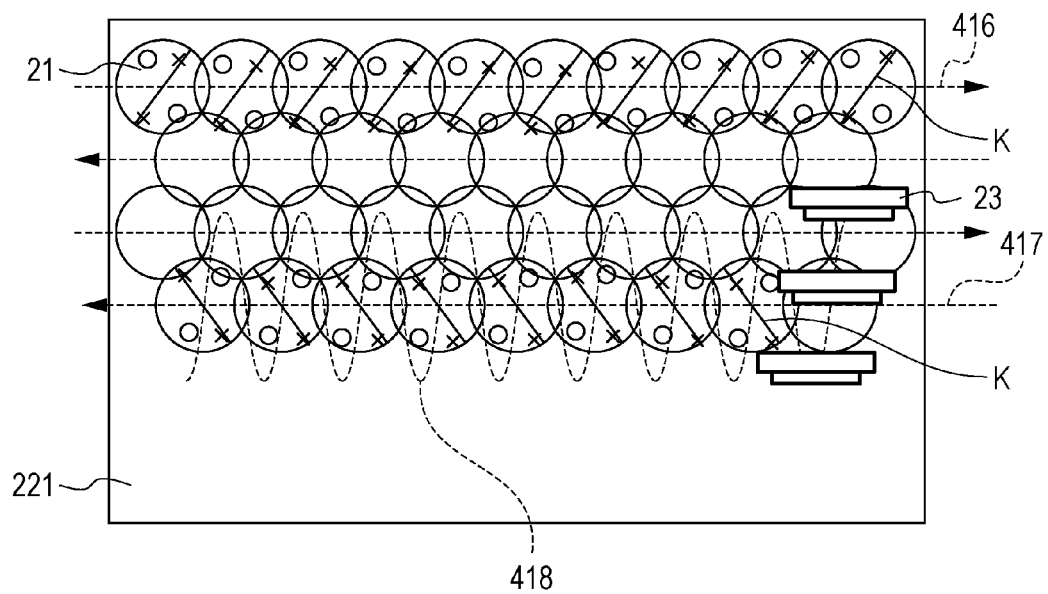

Next, the direction of linear movement will be described with reference to FIGS. 4A and 4B. The same reference numerals will be used to designate the same parts as those in FIGS. 2A to 2C and FIGS. 3A and 3B, and the description thereof will be omitted. FIGS. 4A and 4B are overhead views of the processed surface 221, and schematically show the movement locus 418 of the cutting edge of the tool 23 during processing. By moving the XY-axis moving table 314 in the Y-axis direction, linear movement is carried out. FIG. 4A shows the movement locus 418 of the cutting edge of the tool 23 when the direction 416 of linear movement is from left to right in the paper plane. FIG. 4B shows the movement locus 418 of the cutting edge of the tool 23 when the direction 417 of linear movement is from right to left in the paper plane. In FIG. 4A, the cutting edge of the tool draws a helix as shown by 418, and continuously processes microlens transfer shapes from left to right in the paper plane. At this time, the microlens transfer shapes have such a shape that the curvature of the sectional shape including a center line of the microlens transfer shape varies depending on the direction of the center line. At this time, the outline is not always a part of a true circle (circular arc), and examples thereof include a slightly deformed shape. In that case, the curvature of the outline is the approximate curvature. The approximate curvature is found by a known method. When the average of different curvatures (average curvature) is compared to the curvature of the sectional shape including a center line of the microlens transfer shape, the microlens transfer shape has parts having curvatures smaller than the average curvature and parts having curvatures larger than the average curvature. That is, in parts cut more deeply, the curvature of the sectional shape including a center line of the microlens transfer shape is smaller than the average curvature. These parts are denoted by O. In parts cut more shallowly, the curvature of the sectional shape including a center line of the microlens transfer shape is larger than the average curvature. These parts are denoted by X. In FIG. 4B, the cutting edge of the tool draws a helix as shown by 418, and continuously processes microlens transfer shapes from right to left in the paper plane. At this time, microlens transfer shapes different from a spherical shape are formed. Parts cut more deeply are denoted by O. When transferred, these parts become parts of a microlens in which the curvature of the sectional shape including a center line of the microlens transfer shape is smaller than the average curvature. A center line where the curvature of the sectional shape including the center line of the microlens transfer shape is largest, is denoted by K. Parts cut more shallowly than a spherical shape are denoted by X. When transferred, these parts become parts of a microlens in which the curvature of the sectional shape including a center line of the microlens transfer shape is larger than the average curvature. A center line where the curvature of the sectional shape including the center line of the microlens transfer shape is largest, is denoted by K. Microlens transfer shapes that differ from the microlens transfer shapes of FIG. 4A in the positions of deeply cut parts and shallowly cut parts, are formed. That is, the microlens transfer shapes differ from the microlens transfer shapes of FIG. 4A in the position of a part in which the curvature of the sectional shape including a center line of the microlens transfer shape is larger than the average curvature. For example, as shown in FIGS. 4A and 4B, when a mold for transferring a microlens array is viewed from above, the direction of center line K where the curvature of the sectional shape including the center line of the microlens transfer shape is largest, differs from one row to another.

As described above, by changing the direction of linear movement, such microlens transfer shapes that the direction of center line K where the curvature of the sectional shape including the center line of the microlens transfer shape is largest differs from one row to another, can be formed, and periodicity can be broken.

In this way, a mold for transferring a microlens array in which a large number of microlens transfer shapes are formed is made.

Next, a shape for transferring a Fresnel lens is formed in a mold by a known method, and a mold for transferring a Fresnel lens is made. The mold for transferring a microlens array and the mold for transferring a Fresnel lens are arranged opposite each other, with a space formed therebetween, and resin is poured into the space. Thus, a diffusing plate shown in FIG. 1A that has an array 1 of a large number of microlenses formed on one side thereof and a Fresnel lens formed on the other side thereof, is manufactured.

Alternatively, using a transfer method using electroforming, and using a mold for transferring a microlens array, this shape is transferred to an object to be transferred (first object to be transferred), and a convex replication mold to which this convex microlens transfer shape is transferred, is made. By arranging the obtained replication mold and the mold for transferring a Fresnel lens opposite each other, with a space formed therebetween, and pouring resin into the space, a diffusing plate in which concave microlenses are formed may be manufactured.

First Example

Next, a first example will be described. An example in which a diffusing plate of the first embodiment was made will be shown as a first example.

A diamond bite having a sharp edge, capable of high-precision processing transfer, and having an arcuate cutting edge having a radius of 15 µm was used as a tool 23. A copper-based material, which can be excellently machined with a diamond bite, was selected as the material of a processed layer of a workpiece 22. A high-precision processing machine capable of commanding cutting in submicron order was used as a processing machine. The processing machine had a Z-axis moving table 313 and an XY-axis moving table 314. A high-speed circular movement device 312 was used as a device for circularly moving the tool. In this example, a magnetostriction vibrator was used as a driving source for circular movement. Two magnetostriction vibrators are disposed in orthogonal directions in the high-speed circular movement device, the amplitude, cycle, phase, and so forth of linear movement was controlled by an arbitrary waveform generator 315 such that a circle having a radius of 15 µm is drawn. A condition that two sine waves having an amplitude of 30 µm and a frequency of 880 Hz were synchronized with a phase difference of ¼ wavelength was selected as a waveform condition. The velocity of linear movement was 6.6 mm/s.

By determining the above conditions of circular movement and linear movement, the movement locus of the cutting edge of the tool is unambiguously determined, and draws a helix. The workpiece was processed with a cutting depth of 1 to 5 µm, a microlens transfer shape was processed, and a mold for transferring a microlens array was made.

Next, a mold for transferring a Fresnel lens was made. The mold for transferring a microlens array and the mold for transferring a Fresnel lens were arranged opposite each other, with a space formed therebetween. Into the space, polymethylmethacrylate resin, which is commonly used as a material for an optical element, was poured to obtain a diffusing plate.

Figure 8A:
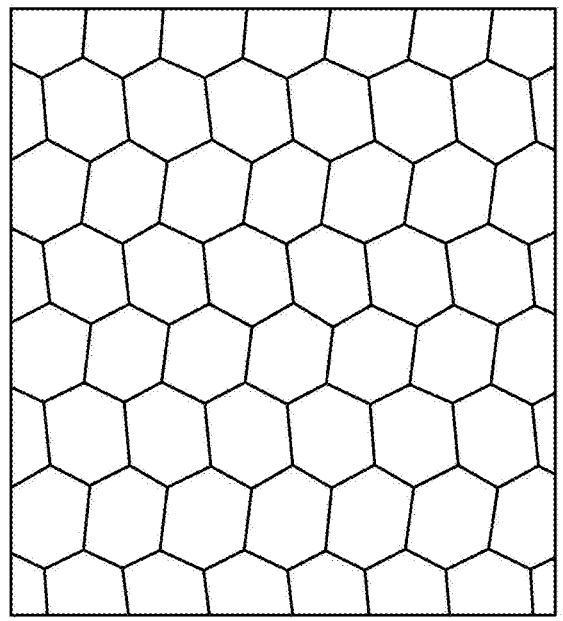
FIGS. 8A and 8B illustrate a diffusing plate according to a first example.
Figure 8B:
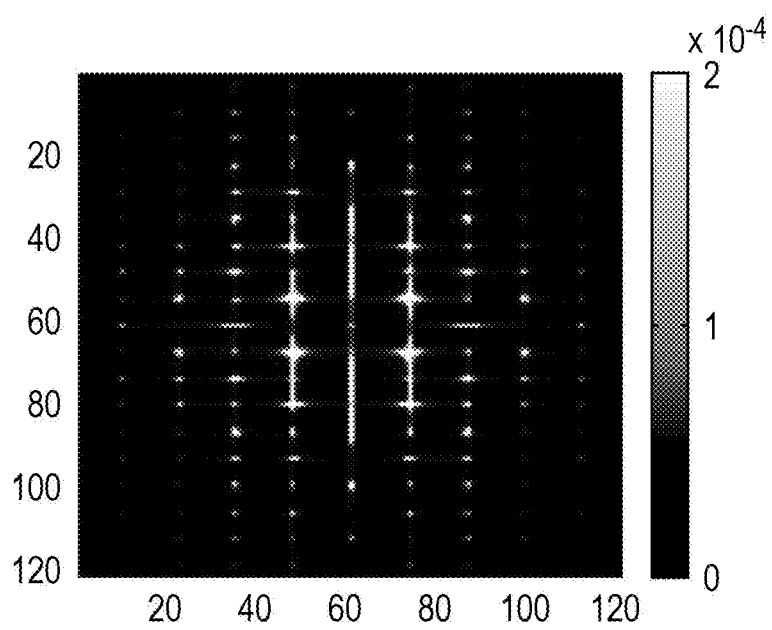
Figure 9A:
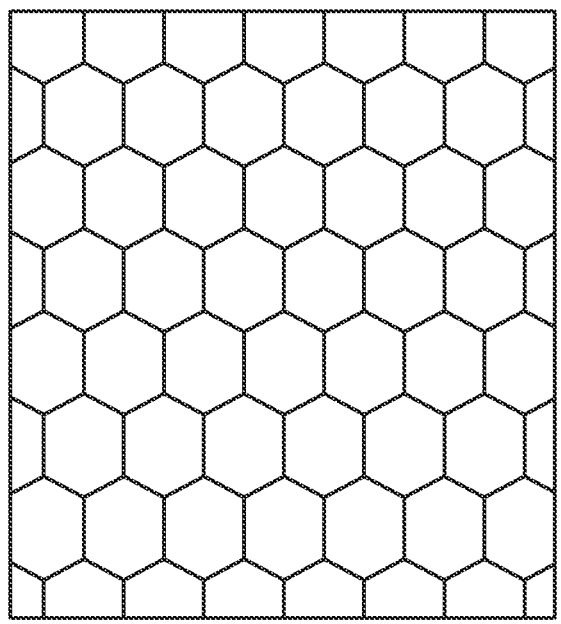
FIGS. 9A and 9B illustrate a diffusing plate according to related art.
Figure 9B:
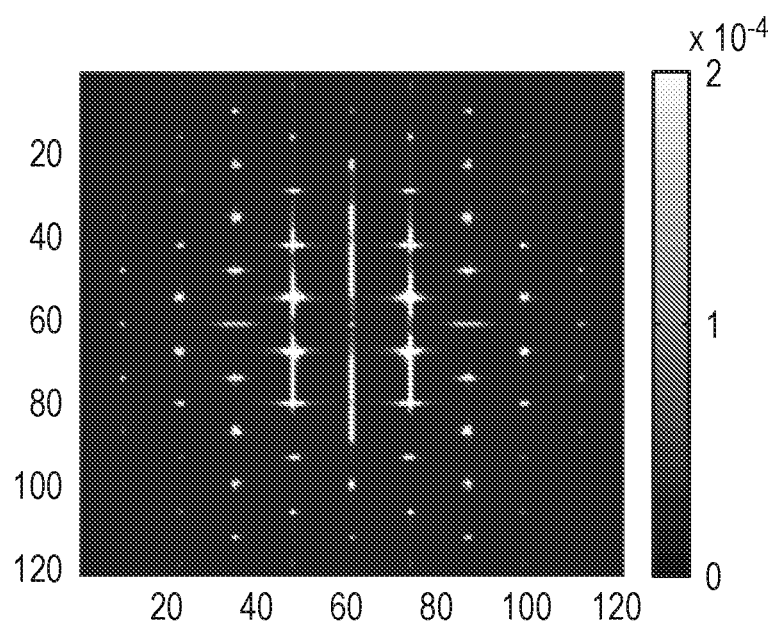

FIG. 8A is a schematic top view of the obtained diffusing plate, and FIG. 8B shows a simulation result of the diffusion property of the diffusing plate shown in FIG. 8A. FIG. 9A is a schematic top view of a conventional diffusing plate for comparison, and FIG. 9B shows a simulation result of the diffusion property of the diffusing plate shown in FIG. 9A. It was found that, compared to in the conventional diffusing plate, in the diffusing plate in this embodiment, the interval between luminescent spots of diffusion distribution were narrow, accordingly the number of observed luminescent spots was large, and the luminance of each luminescent spot decreased in proportion to the number of luminescent spots. As a result, luminescent spots become less noticeable, and natural blur quality was able be provided. A diffusing plate that is free from moire fringes when used together with a Fresnel lens was able be obtained.

Second Embodiment

Figure 5:
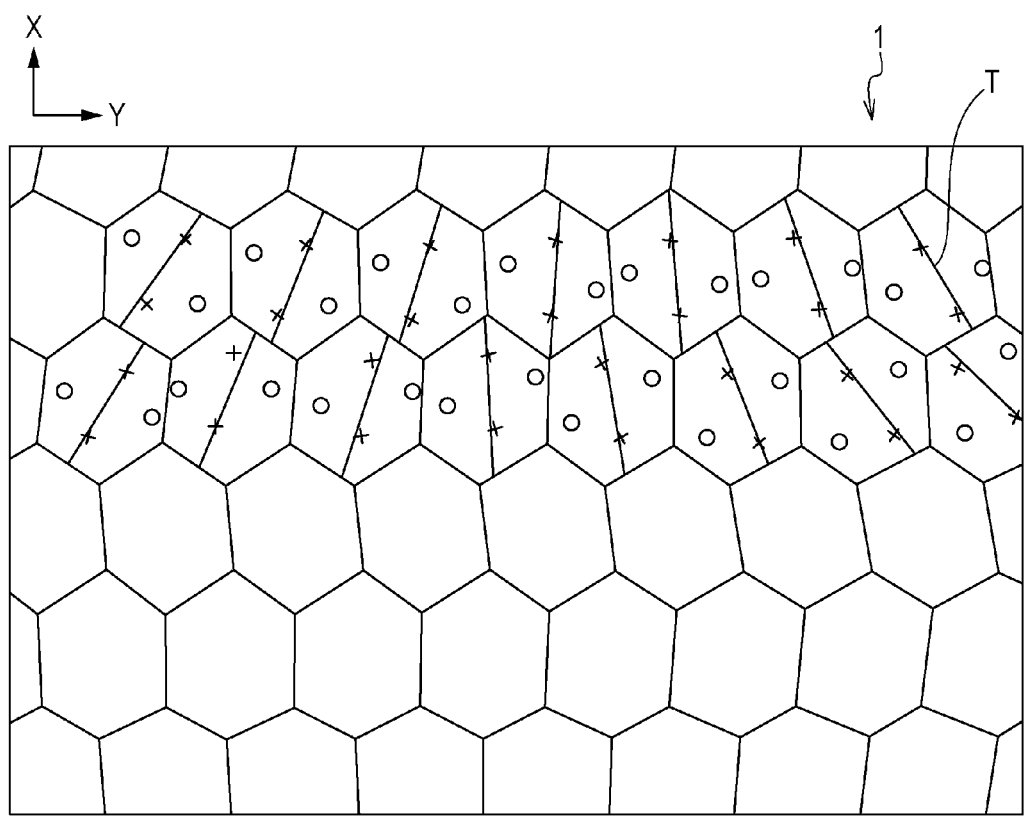
FIG. 5 illustrates a diffusing plate according a second embodiment.

FIG. 5 is a schematic top view of a microlens array forming surface of a diffusing plate of a second embodiment. The same reference numerals will be used to designate the same parts as those in FIGS. 1A to 1D, and the description thereof will be omitted. In the microlenses shown in FIG. 5, parts higher than a spherical shape having the average curvature are denoted by O, parts lower than a spherical shape having the average curvature are denoted by X, and a center line where the curvature of the sectional shape including the center line of the microlens is largest, is denoted by T. As shown in FIG. 5, microlenses arranged in a row differ slightly from one another in the direction of a center line T where the curvature of the sectional shape including the center line of the microlens is largest. Adjacent microlenses differ from each other in the angular positions of parts higher and lower than a spherical shape having the average curvature, by a predetermined angle. In other words, adjacent microlenses differ from each other in the direction of center line T where the curvature of the sectional shape including the center line of the microlens is largest, by a predetermined angle. The predetermined angle can be determined arbitrarily. The predetermined angle may be a constant angle or may be changed.

A method for manufacturing the diffusing plate of the second embodiment will be described. The differences from the first embodiment will be described, and the description of parts that are equal to those of the first embodiment will be omitted. In the first embodiment, a method for forming a mold for transferring a microlens array was described that included helically moving the cutting edge of the tool by combining the circular movement of the cutting edge of the tool and the linear movement by moving the XY-axis moving table 314 in the Y-axis direction. In this embodiment, a θ table is installed on the XY table, and not only linear movement but also circular movement is carried out relative to a workpiece. Thus, processing is carried out while slightly changing the positions of parts processed more deeply and more shallowly than a spherical shape having the average curvature. If the direction of rotation is reversed, the ridge line can also be rotated in the reverse direction. In a diffusing plate manufactured using a microlens array transfer mold obtained in this way, microlenses slightly differ from one another in diffusion property, therefore periodicity is further broken, and the diffusing plate has a uniform diffusion property with low directivity.

Second Example

Next, a second example will be described. An example in which a diffusing plate of the second embodiment was made will be shown as a second example.

In the second example, a workpiece was rectangular in shape and measured 20 mm on a side, the angular velocity of the rotating shaft was adjusted such that the velocity of the tool at a processing point that was linearly moved was constant regardless of the distance from the center of rotation, and control was carried out such that the relative velocity is 2 mm per second. The drive frequency of the high-speed circular movement device was 100 Hz, the radius of the circular movement of the tool was 20 μm, and about 1000 microlenses having an average radius of 20 μm were thereby continuously formed at intervals of 20 μm.

Thus, a row was processed. When the tool processes the next row after passing over the workpiece, the next row may be processed by reversing the direction of rotation of the rotating shaft as long as the relative velocity of the workpiece at the processing point and the frequency of the circular movement are constant. By adjusting the quadrant from which processing of a row is started, that is, the direction from the center of rotation of the workpiece to the cutting edge of the tool, the direction of cutting can be selected row by row.

Since the tool and the workpiece can be rotated relative to each other, microlenses were able to be formed continuously while changing the direction of circular movement during linear movement. Thus, the direction of the microlens shape (positions of parts higher and lower than a spherical shape having the average curvature) was able to be changed freely. In the whole area of the microlens array transfer shape, the microlens shape was able to be turned in various directions. Therefore, in the whole area of the diffusing plate, microlenses having different diffusion properties were able to be arranged. The periodicity that had been a problem in the conventional microlens array was broken, and natural blur quality was able be provided. A diffusing plate that is free from moire fringes when used together with a Fresnel lens was able be obtained.

Third Embodiment

In this embodiment, a diffusing plate in which a microlens array is formed on a spiral two-dimensional curve will be described.

Figure 6A:
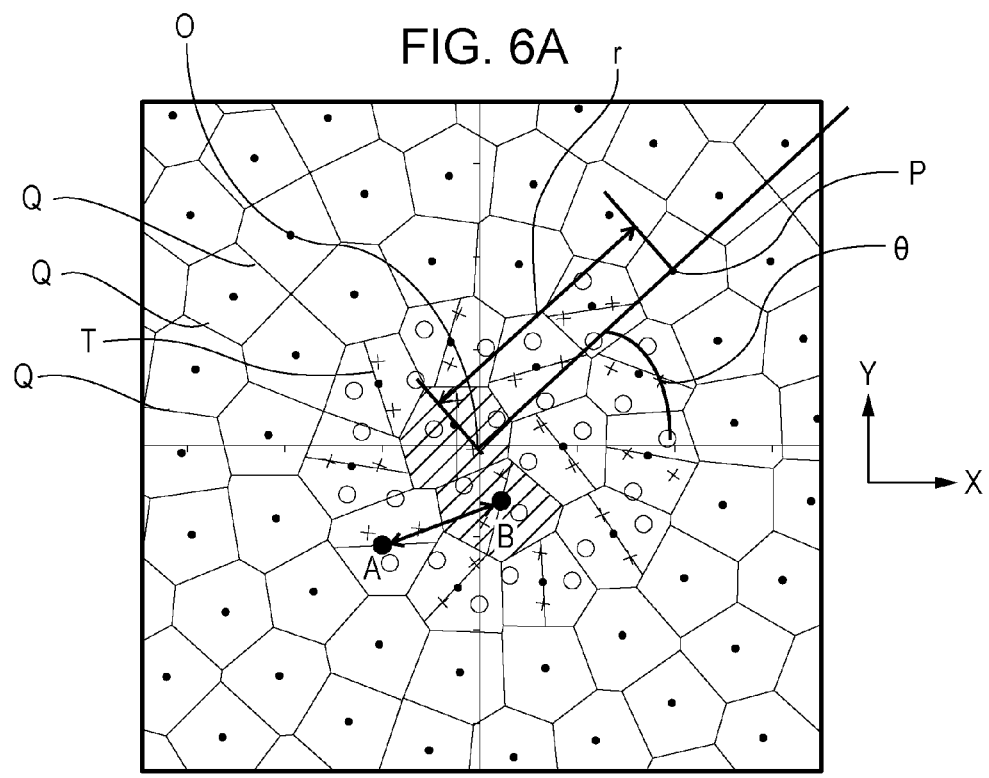
FIGS. 6A and 6B illustrate a diffusing plate according to a third embodiment.
Figure 6B:
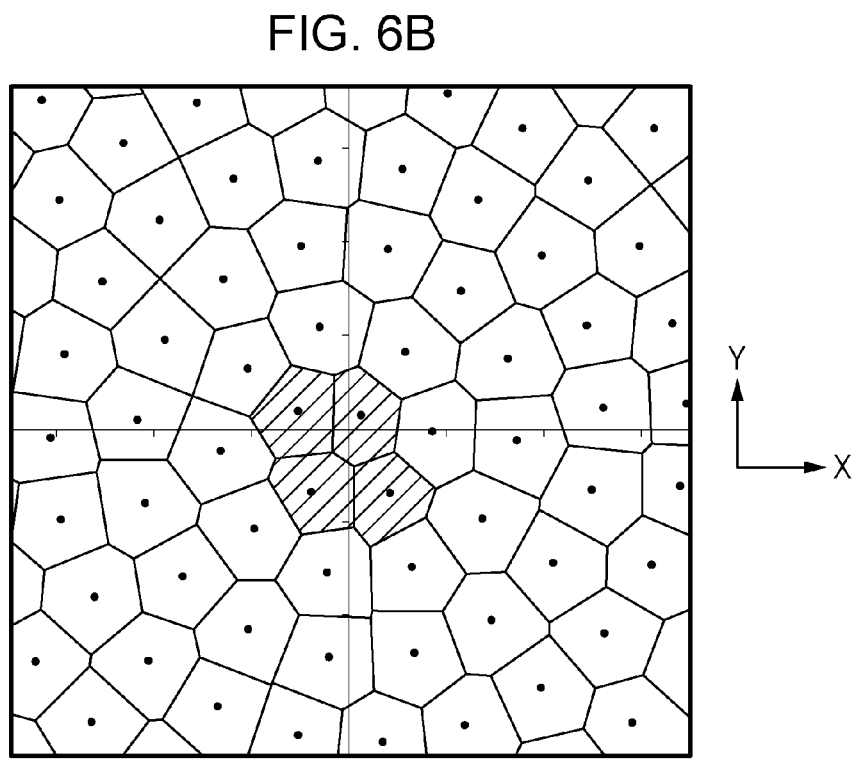

FIGS. 6A and 6B are top explanatory diagrams showing the surface shape of a microlens array that is formed on a spiral two-dimensional curve according to the above-described conditions. The same reference numerals will be used to designate the same parts as those in FIGS. 1A to 1D, and the description thereof will be omitted. FIG. 6A shows an example of a microlens array having various shapes. Parts higher than a spherical shape having the average curvature are denoted by O, and parts lower than a spherical shape having the average curvature are denoted by X. A center line where the curvature of the sectional shape including the center line of the microlens is largest, is denoted by T. The microlenses slightly differ from one another in the direction of center line T where the curvature of the sectional shape including the center line of the microlens is largest.

FIG. 6A shows the surface shape of a microlens array in which microlenses are continuously arranged on a spiral two-dimensional curve extending from the XY center, at intervals such that the curve length is constant. A region bounded by various polygons bounded by straight lines is a microlens, and the straight lines are ridge lines. The dot in the microlens region denotes the vertex of individual microlens. In the case of a concave surface, the vertex is the lowest position. In the case of a convex surface, the vertex is the highest position.

FIG. 6A shows an example in which the vertices of microlenses are arranged along a locus of polar curve described by R=aθ (Archimedean spiral). The Archimedean spiral is a curve such that the distance r from the origin O to a point P is proportional to the phase angle θ.

In an Archimedean spiral, R denotes the radial distance from a center point (origin) at an arbitrary angle, θ denotes a polar angle [rad], and a is a coefficient of magnitude. Generally, the distance from the center (R) increases with an increasing angle, therefore the distance R is proportional to the angle θ. The coefficient a determines how tight the spiral warps around the origin; the spiral becomes tighter for small values of a and wider for large values. The shape characteristic of the diffusing plate of this embodiment is that microlenses are aligned counterclockwise and the vertices of the microlenses trace a locus defined by a polar curve. Microlenses adjacent in the circumferential direction of the Archimedean spiral are roughly at the same radial distance from the center. Therefore, a ridge line separating the centers of adjacent microlenses is nearly a bisector. Therefore, the ridge line Q faces substantially the center. This is also characteristic.

In FIG. 6A, it can be seen that, with decreasing distance from the center of rotation, the difference between the length of the straight line segment between the vertices of microlenses and the length of the curve of the Archimedean spiral between the vertices of microlenses increases, and the variation of interval between the vertices of microlenses increases in both circumferential direction and radial direction. So, the positions of microlenses near the center are not defined on the Archimedean spiral, and microlenses are rearranged evenly from the periphery to the center. FIG. 6B shows the surface shape of the resulting microlens array. The number of microlenses in a hatched part is increased from two (FIG. 6A) to four (FIG. 6B). The vertices (dark dots) of the microlenses are arranged such that the distances from the vertices on the peripheral side thereof are equal.

Figure 7A:
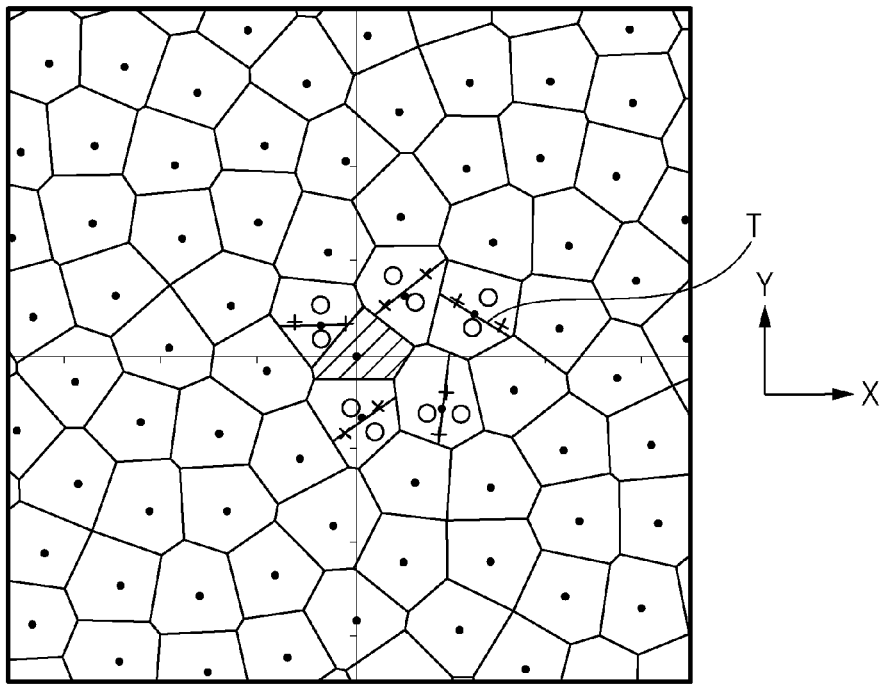
FIGS. 7A and 7B illustrate a diffusing plate according to a fourth embodiment.
Figure 7B:
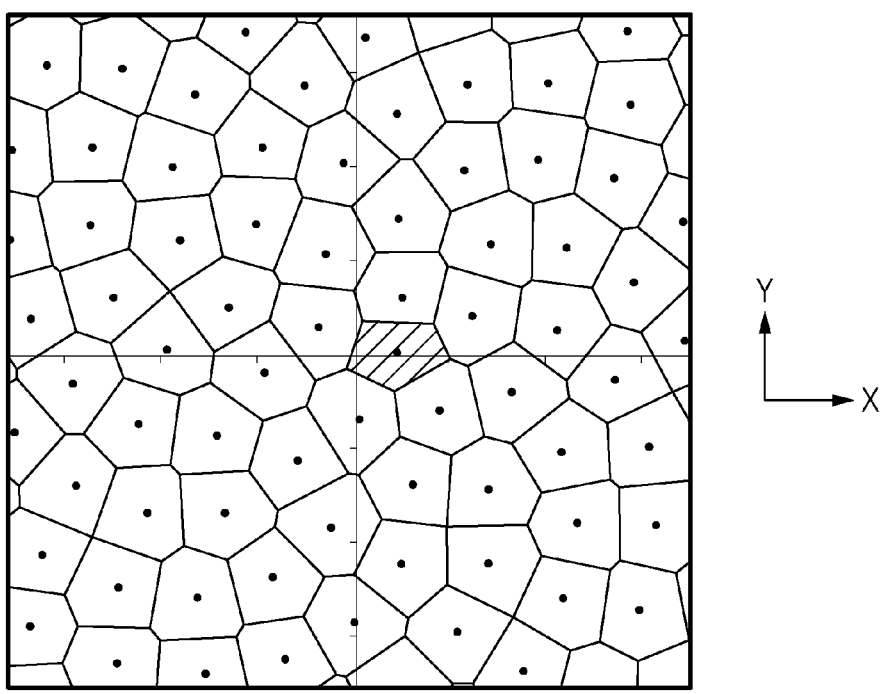

FIGS. 7A and 7B are diagrams showing the surface shape of a microlens array that is formed on a spiral two-dimensional curve in a pattern different from that shown in FIGS. 6A and 6B.

FIG. 7A shows the surface shape of a microlens array in which microlenses are continuously arranged on a spiral two-dimensional polar curve at regular angular intervals. A region bounded by various polygons bounded by straight lines is an example of a microlens, and the straight lines are ridge lines. The dot in the microlens region denotes the vertex of individual microlenses.

The vertices of microlenses of FIG. 7A are arranged such that the vertices form a locus along a two-dimensional curve described by $R=a\theta^{0.5}$ (parabolic spiral).

Similarly, R denotes the distance from the center (origin) at an arbitrary angle, and θ denotes a polar angle [rad], and a is a coefficient of magnitude of how tight the spiral warps around the origin. The spiral becomes tighter for small values of a and wider for large values.

The distance from the center increases with increasing angle. However, in the case of FIG. 7A, the distance R is proportional to the square root of angle. In this example, a=6, and microlenses were arranged on a parabolic spiral, at angular intervals, the smaller one of two angles obtained by dividing 2π [rad] at a ratio of 1:(1+α)/2. α is an irrational number, and the smaller angle is within the range of 80° to 180°. In this example, α was √5, and microlenses were arranged at intervals of about 137.5°.

As can be seen from FIG. 7A, the distances between the vertex of the microlens located in the XY center and the vertices of surrounding microlenses are particularly small. So, the position of the microlens in the center is not defined on the parabolic spiral, and microlenses are rearranged evenly from the periphery to the center. FIG. 7B shows the surface shape of the resulting microlens array. Microlenses are arranged such that the distances between the vertex of the central microlens hatched in FIG. 7A and the vertices of surrounding microlenses are equal.

A diffusing plate having this shape can be manufactured with high efficiency because, in a method for manufacturing a mold for transferring a microlens array, the movement of a stage is small, and continuous processing is possible.

A diffusing plate having a microlens array in which unnaturalness of blur quality and moire fringes are less noticeable, with which focusing can be easily carried out, and that is bright can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-130860, filed Jun. 21, 2013, which is hereby incorporated by reference herein in its entirety.

What is claimed is:

1. A diffusing plate comprising:
a microlens array in which a plurality of rows of microlenses are arranged adjacent to each other,
wherein the microlenses have such a shape that a curvature of a sectional shape including a center line going through a center of each microlens, which is a vertex and shows a highest position of the microlens, varies depending on a direction of the center line, and
wherein, in the microlens array, the direction of a center line of each microlens where the curvature of the sectional shape is largest is different from a direction parallel to the row and different from a direction perpendicular to the row.

2. The diffusing plate having a microlens array according to claim 1, wherein the microlenses have two parts higher than a spherical shape and two parts lower than the spherical shape at positions axisymmetrical to the highest position of each microlens.

3. The diffusing plate having a microlens array according to claim 2, wherein the direction of the center line where the curvature of the sectional shape is largest differs from one row to another.

4. The diffusing plate having a microlens array according to claim 2, wherein the microlenses arranged in each row differ from one another in the direction of the center line where the curvature of an outline is largest.

5. The diffusing plate having a microlens array according to claim 1, wherein a Fresnel lens is formed on a side different from a side on which the microlens array is formed.

6. A diffusing plate comprising:
a microlens array in which a plurality of microlenses are arranged,
wherein the microlenses have such a shape that a curvature of a sectional shape including a center line going through a center of each microlens, which is a vertex and shows a highest position of the microlens, varies depending on a direction of the center line, and
wherein microlenses that are arranged next to each other in a row differ in the direction of a center line where the curvature of the sectional shape is largest, and
wherein the vertices of the microlenses are arranged spirally.

7. The diffusing plate having a microlens array according to claim 6, wherein vertices of the microlenses are arranged on a curve defined by $R=a\theta^{0.5}$ which is a parabolic spiral.

8. The diffusing plate having a microlens array according to claim 5, wherein the microlenses have two parts higher than a spherical shape and two parts lower than the spherical shape formed at axisymmetrical positions with respect to the vertex.

* * * * *